Feb. 14, 1967     H. W. CHRISTENSON     3,303,726
AUTOMATIC TRANSMISSION

Original Filed Nov. 8, 1954     4 Sheets-Sheet 1

INVENTOR.
HOWARD W. CHRISTENSON
BY
*a. M. Heiter*
ATTORNEY

United States Patent Office 3,303,726
Patented Feb. 14, 1967

3,303,726
AUTOMATIC TRANSMISSION
Howard W. Christenson, Indianapolis, Ind., assignor to General Motors Corporation, Detroit, Mich., a corporation of Delaware
Original application Sept. 10, 1958, Ser. No. 761,664, now Patent No. 3,236,117, dated Feb. 22, 1966. Divided and this application Oct. 13, 1965, Ser. No. 495,558
8 Claims. (Cl. 74—751)

This application is a division of the applicant's application S.N. 761,664, Patent No. 3,236,117, filed September 10, 1958, which is a continuation of application S.N. 467,277 filed November 8, 1954, now abandoned.

There are a number of objects of the invention included among which is the provision of a torque transmitting mechanism which can be constructed as a relatively small compact unit, relative, of course, to the size and power of the engine and size of the vehicle with which it is to be used and torque transmission requirements.

The planetary gear sets are each arranged to be controlled by friction devices such as a clutch and a brake. The clutch, for example, interengages certain elements of the planetary unit so that the members thereof rotate in unison and transmit torque at 1:1 ratio; the brake, for example, engages an element of the planetary gearing to ground and thus holds it stationary to transmit torque at an increased ratio. The clutch and brake are arranged to cooperate with each other so that one takes the reaction of the other and in making the change between clutch engagement and brake disengagement and vice versa, there is a self-timing arrangement resulting in no hiatus or time interval between the engagement of one and disengagement of the other. Thus a smooth shift from one condition to the other is obtained. Moreover, one of the controlling friction devices, such as the brake in this instance, is self-energizing and this is accomplished by utilizing the axial thrust placed on a member thereof incident to the transmission of torque through gearing with helical teeth. This self-energizing feature aids in the self-timing relationship. The brake of one planetary unit may be completely self-energizing, capable of complete engagement for the transmission of torque in the absence of engaging pressure otherwise provided. The brake of the other planetary unit which functions in a lower range may be only partially self-energizing.

Other objects will appear as the detailed description is considered in connection with the accompanying drawings.

The drawings show a transmission and a hydraulic system constructed in accordance with the invention.

THE GEARING

Figures 1, 12:
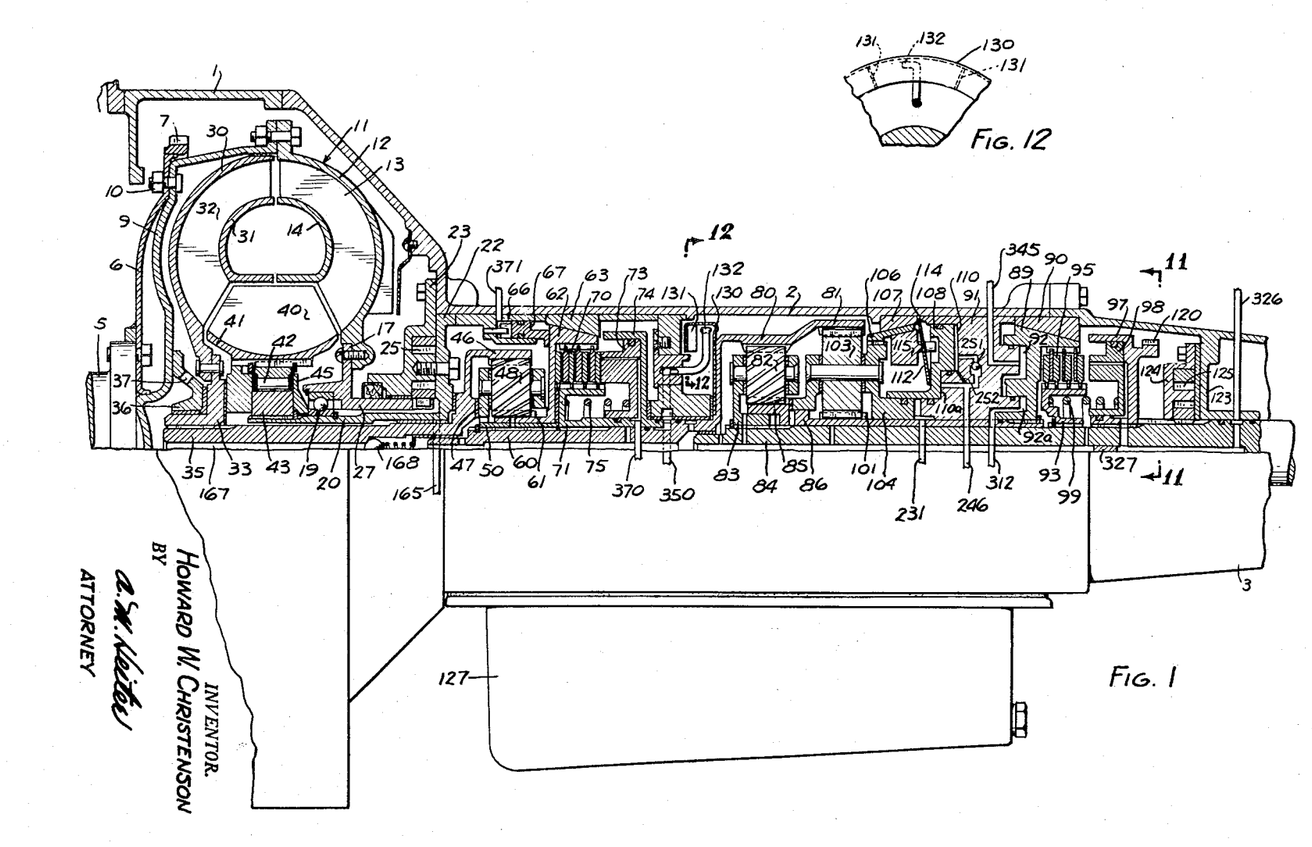
FIGURE 1 is a general cross-sectional view illustrating the mechanism of the transmission including the fluid torque converter and the gear sections.
FIG. 12 is a detail view illustrating the Pitot tube taken on line 12—12 of FIG. 1.

The transmission shown in FIG. 1 is one adapted for use with an automotive vehicle and it has a casing with an enlarged part 1 for connection to the body or block of the engine, a smaller extending part 2, and a terminal part 3. The crankshaft of the engine is illustrated at 5 and connected thereto is a plate or flywheel 6 which may have on its periphery teeth of a starter gear 7.

A rotary fluid torque converter is associated with the flywheel 6 to receive the torque of the engine. It has a forward enclosing plate 9 connected to the member 6, as at 10, and an impeller or pump, generally illustrated at 11, and having an outer wall 12, blades 13 and a core 14. Secured to the inner part of the pump, and constituting a part thereof, is a member 17, journalled on a bearing 19 for taking axial thrust. The bearing is mounted on a ground sleeve 20 which has a flange 22 which forms part of a pump housing. A member 23 completes the pump housing and the pump elements are illustrated at 25. The inner pump element is driven by the sleeve portion 27 of the member 17. Thus, the shaft of the engine drives the pump or impeller 11 of the torque converter and the pump 25.

The turbine or driven member of the torque converter has an outer wall 30, a core portion 31 and blades 32. The turbine has a hub portion 33 keyed or splined to a shaft 35. There is a pilot bearing for the hub 33 and the forward end of the shaft 35 which is disposed in a member 36 which is secured to the forward plate 9, and which is provided with a number of openings as indicated at 37.

The stator of the torque converter has blades 40 and an outer wall 41. The stator is mounted on the ground sleeve 20 through the means of an overrunning or one-way brake shown herein as embodying rollers 42 with an inner race 43 splined or keyed to the ground sleeve. A thrust element 45 is positioned between the inner race of the thrust bearing 19 and the one-way coupling 42.

It will thus be seen that the impeller, turbine, and stator cooperate to form a torus chamber designed to be maintained full of liquid under pressure. When the impeller is caused to rotate the liquid in the torus chamber moves counterclockwise therethrough as FIG. 1 is viewed, and impinges on the blades 32 of the turbine delivering torque thereto. The blades of the stator redirect the liquid as it passes from the turbine to the impeller so that the torque is multiplied. As is known to those versed in the art, when the stator blades function to redirect the liquid, or oil as it may more conveniently be called, the stator is held stationary as it cannot rotate reversely because of the one-way brake 42. As the speed increases, however, the stator blades ultimately perform no redirecting function of the oil so that it may rotate freely forwardly. The one-way coupling 42 is called a brake since it connects the stator to a stationary element, this term being used to comply with the terminology customarily required in cases of this kind. Also this term is used in this sense for certain friction engaging devices in the gearing.

The gearing comprises essentially two sections, each having epicyclic gears therein more commonly referred to as planetary gears. In the front section the ring gear 46 is formed as a part of the shaft 35; the carrier 47, which a plurality of planet gears 48 thereon, has a hub portion 50 splined or keyed to the shaft 60. The sun gear 61 is journalled on the hub 60 and is formed as a part of a cone-shaped brake member 62 which cooperates with an internally coned brake member 63 carried by the housing. The member 62 may be steel and the member 63 may be bronze or other similar alloy. A piston 67 of annular form is arranged to act upon the brake member 62 and it is disposed in a cylinder 66. There is a clutch shown as being of the multiple disc type and generally indicated at 70 disposed between the member 62 and a member 71 keyed or splined to the shaft 60. This clutch is actuated by a piston 73 disposed in a cylinder 74 and a coil spring 75 acts upon the piston 73 and reacts on the member 71.

The teeth of the gears 46, 48 and 61 are of the helical type. As a result, when they are subjected to load an axial thrust is placed upon the sun gear 61 and the cone brake member 62. The arrangement is such that when the gears are subjected to load by forward driving torque the sun gear and cone brake member are shifted to the right as FIG. 1 is viewed, to cause the cone brake member 62 to engage the brake member 63. A preferred arrangement is that this brake is 100% self-energizing in this sense. This influences the operation of the gear set as will later be seen. The piston 67 functions to insure engagement of the brake and to hold it engaged under all conditions where engagement is desired. An advantageous arrangement is where the helical angle of the gear teeth is about 38°, and the angularity of the cone brake surfaces are about 8°.

When the cone member 62 is engaged with the brake member 63 the cone member 62 and the sun gear 61 are held stationary. Therefore, the ring gear 46 will drive the carrier 47 and shaft 60 in the same direction of rotation as the ring gear 46 but at a lower speed. If the piston member 73 is urged to the left, as by the introduction of hydraulic medium in the cylinder 74, the clutch 70 is engaged since the cone member 62 transfers reaction through the gearing and through sun gear 61, carrier 47 and shaft 60 to the casing 2. This transfer of reaction through the gearing relies upon both the helix angle of the gearing and the mechanical stop provided by the gear carrier. This interengages the sun gear 61, the shaft 60 and the carrier 47 so that they must rotate in unison. Therefore, the ring gear 46 drives the shaft 60 through the pinions 48, without rotation of the pinions about their respective axes, in the same direction and at the same speed.

At this point it is to be noted that the member 62 is urged in one direction for application of the cone brake and is urged in the opposite direction for the application of the disc clutch. The member 62 is slidable on the shaft 60 and it takes the reaction for engaging the clutch 70. Accordingly, when the clutch 70 is to be engaged by application of hydraulic medium in the cylinder 74, the member 62 is shifted to the left and thus the cone brake is positively disengaged. During this shifting the clutch is partially engaged. When the reaction is fully shifted to casing 2, as noted above, the shifting stops and the clutch is fully applied.

The rear gear section is shown as having two ring gears 80 and 81 formed as a part of the shaft 60. The shaft 60 is the output member for the front section and the input member for the rear section. The ring gear 80 is associated with planet gears 82 on a carrier 83 splined or keyed to a final output shaft 84. The sun gear 85 has a sleeve 86, the rear end of which is connected to a cone brake member 89, which may be steel, cooperating with an internally coned brake member 90 which may be bronze. The brake member 89 is axially shiftable and it cooperates with a member 91 to provide a cylinder 92. Situated between the member 89 and a member 93 which is keyed or splined to the shaft 84 is a clutch, shown as a multiple disc clutch 95. A cylinder member 97 is mounted on the shaft 84 and in it is a piston 98 operable on the clutch 95. A coil spring 99 keeps the piston retracted in its cylinder. If the brake 89-90 is engaged the brake member 89, sleeve 86 and sun gear 85 are grounded, so to speak, and thus held stationary. At this time the ring gear 80 drives the carrier 83 and the shaft 84 in the same direction but at a lower speed than the ring gear 80, while the planet gears 82 rotate on their axes and revolve around the stationary sun gear. If hydraulic medium be introduced into the cylinder 97, engaging the clutch 95, the sun gear 85 and the shaft 84 are thus clutched together and must rotate in unison. The ring gear 80, under these circumstances, drives the shaft 84 at the same speed, through the planet gears 81 which cannot rotate. The brake member 89 takes the reaction for the engagement of the clutch 95 and in doing so it is urged to the left as FIG. 1 is viewed, and the brake engagement between the cone element 89 and the brake element 90 is thus positively disengaged. The reaction of brake 89-90 is self-energizing due to the helical teeth but to a lesser extent because of the greater ratios and higher torques involved. The helical angle of the gear teeth and of the cone surfaces may be the same as those of the front planetary gear set and brake.

The ring gear 81 is for reverse. It is associated with a sun gear 101 mounted on sleeve 86. Planet gears 103 are journalled in a carrier 104. The carrier has a cone-shaped brake member 106, which may be steel, cooperating with an internally coned ground brake member 107 which may be bronze. A piston 108 in a cylinder 110 in member 91 acts upon the brake 106-107 preferably through means of a spring annulus known as a Belleville washer or Belleville spring 112. The outer peripheral edge of the spring is fulcrumed against the member 91 as at 114. The inner peripheral edge is engaged by the piston 108, and the spring engages a shiftable cone member 115 which may be bronze. If the piston 108 be shifted to the left by the introduction of hydraulic medium into the cylinder 110, the cone member 106 is engaged between the brake member 107 and member 115. It will be noted that the piston 108 has two diameters or two portions thus forming a secondary cylinder 110a which will be considered later. The cone brake 106-107 is not self-energizing as the member 106 is slidably keyed or splined to the carrier 104. The engagement of this brake is made adequate because of the leverage advantage afforded by the Belleville washer.

If the brake 106-107 is applied, the carrier 104 is grounded and held stationary. Thus the sun gear 101 and its sleeve 86 are operated in the reverse direction. Similarly sun gear 85 operates in the reverse direction. And due to the fact that the ring gear 80 is smaller than the ring gear 81, that is, being of smaller diameter and therefore having fewer teeth, and the sun gear 101 is smaller than the sun gear 85, the net result is that the carrier 83 is operated in the reverse direction thus turning the output shaft 84 in the reverse direction.

Figures 3, 4, 11:
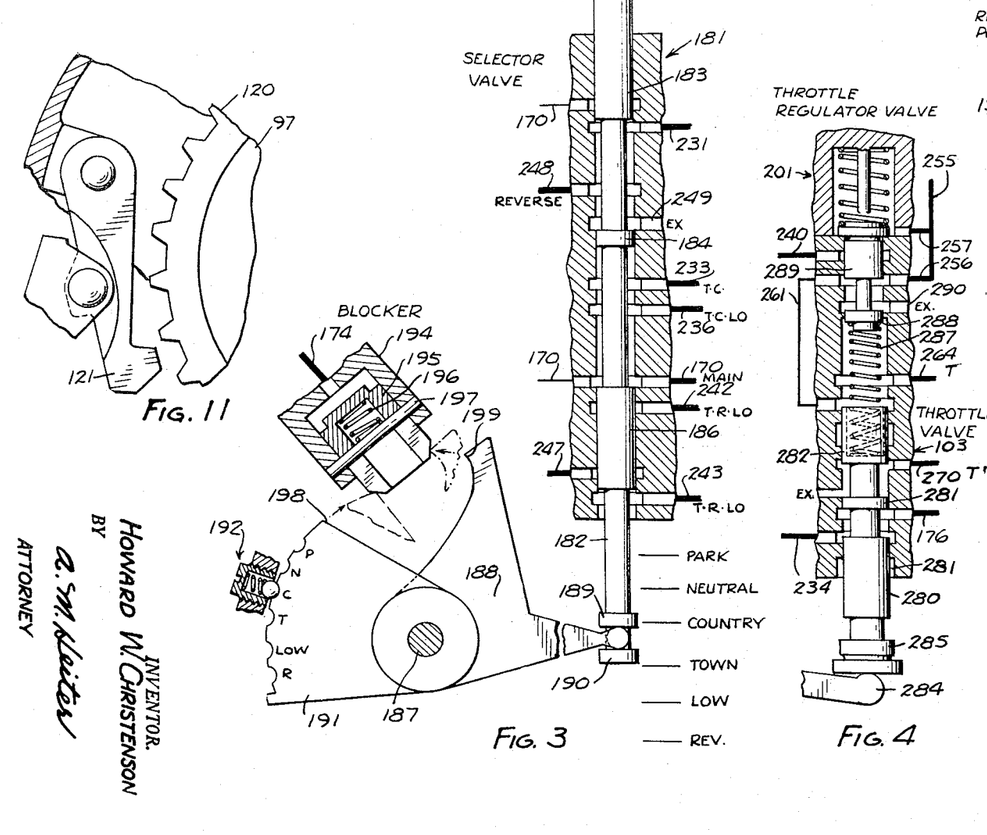
FIG. 3 is an enlarged cross-sectional view of the manually controlled selector valve and the operator therefor.
FIG. 4 is an enlarged sectional view of the throttle valve and throttle regulator valve.
FIG. 11 is an enlarged partial cross-sectional view taken on line 11—11 of FIG. 1 illustrating a parking device.

The cylinder member 97 may be provided with a toothed portion 120 arranged to be engaged by a latch or detent 121 when the vehicle is parked (FIG. 11). This locks the output shaft 84 and the driving wheels of the vehicle against rotation. The detent may be manually controlled by means not shown.

There is a rear pump for hydraulic medium having a pump housing constituted by a portion 123 of the housing and a housing member 124, the pump elements being generally illustrated at 125 and driven by the output shaft 84. The underside of the casing 2 of the transmission may be provided with a suitable sump 127 for hydraulic medium. There is a Pitot tube arrangement for applying controlling pressure and this is shown as being in the form of a shell 130 attached to and rotatable with the ring gear 80. Oil is accumulated in the shell and forms a rotating ring of oil held outwardly in the shell by centrifugal force. Rotation of the body of oil in the shell is facilitated by blades 131. A Pitot tube 132 is positioned in the shell with its open end facing upstream relative to the direction of rotation of the body of oil in the shell (FIG. 12). Thus the velocity head is impressed on the oil in the Pitot system and this is employed as a controlling factor responsive to speed.

The cone brake members 62 and 89, which provide reaction for establishing the low ratios, may be of steel and thus the steel surfaces thereof engage the internally coned brake members 63 and 90. In order to provide a desirable coefficient of friction, the cone surfaces of the members 62 and 90 may be traversed by grooves formed therein. An advantageous arrangement is that of having crossing grooves so that the surfaces are, in effect knurled.

A general description of the operation of the mechanism thus far described would seem to be in order before describing the hydraulic control and the various automatic features. In doing this, gear ratios will be referred to but it is to be understood that these particular ratios are exemplary only and that the transmission may be designed for obtaining other ratios.

It will be noted that the transmission embodies two planetary gear units for forward driving, namely, the front unit embodying the ring gear 46, pinions 48, sun gear 61, and the rear unit embodying ring gear 80, pinions 82, and sun gear 85. With this arrangement, the transmission actually provides four speeds forward but it is to be controlled so that the normal forward driving is in two ranges of two gear ratios each. There is a low range which may be considered as the town range and a high range which tain operation in this low or town range.

Low or town range: In this range the rear unit remains in reduction with the brake 89–90 engaged. This reduction may be 1.5:1. In the low ratio of this range the brake 62–63 of the front unit is engaged; this may give a reduction, say of 1.4:1. The overall reduction is thus about 2.10:1. The vehicle may be started in this low ratio and at a proper time, that is, under proper conditions of speed and torque, the brake 62–63 is released, the clutch 70 engaged, and thus the front unit is shifted into high ratio. The transmission now transmits torque at a 1:1 ratio through the front unit and 1.5:1 through the rear unit. The operator may selectively set a control valve to maintain operation int his low or town range.

High range or country range: In this range the operator makes his selection to engage clutch 95 and release the brake 89–90 and thus the rear unit is conditioned to transmit torque at 1:1 ratio. At the start, the front unit has the brake 62–63 engaged and thus torque is transmitted therethrough at 1.4:1 ratio. Under proper torque and speed conditions, the brake 62–63 releases, the clutch 70 engages and the front unit transmits torque at 1:1 ratio and since the rear unit is conditioned to transmit torque at 1:1 ratio, the overall ratio through the gearing is 1:1.

The torque converter: Of course, the above ratios refer only to the condition in the gearing. The torque converter being forward of the gearing varies the ratio between the engine crankshaft and the shaft 35 and its ring gear 46. Accordingly, the particular gear ratio in the gearing is multiplied by that provided by the torque converter.

Low lockup: The operator may, by proper selection of control, condition the transmission so that both front and rear units remain in their respective low ratios.

Reverse: As heretofore explained, the operator, by suitable control, may cause engagement of the brake 106–107 which holds the carrier 104 stationary thus driving sleeve 86 reversely and sun gear 85 reversely which, in conjunction with the ring gear 80, and pinions 81, drive the carrier 83 and the output shaft 84 into reverse direction. This may be an overall reduction of 2.8:1.

Neutral: In neutral condition the front planetary unit may be in reduction and the rear unit in neutral.

Parking condition: In parking condition, available only at very low vehicle speeds, the front unit may be in reduction and the rear unit always is in neutral, and furthermore, when parking, the detent 121 may be engaged with the teeth 120 of the member 97 to thus hold the traction wheels against turning.

HYDRAULIC CONTROL SYSTEM

Figures 2, 2A, 2B:
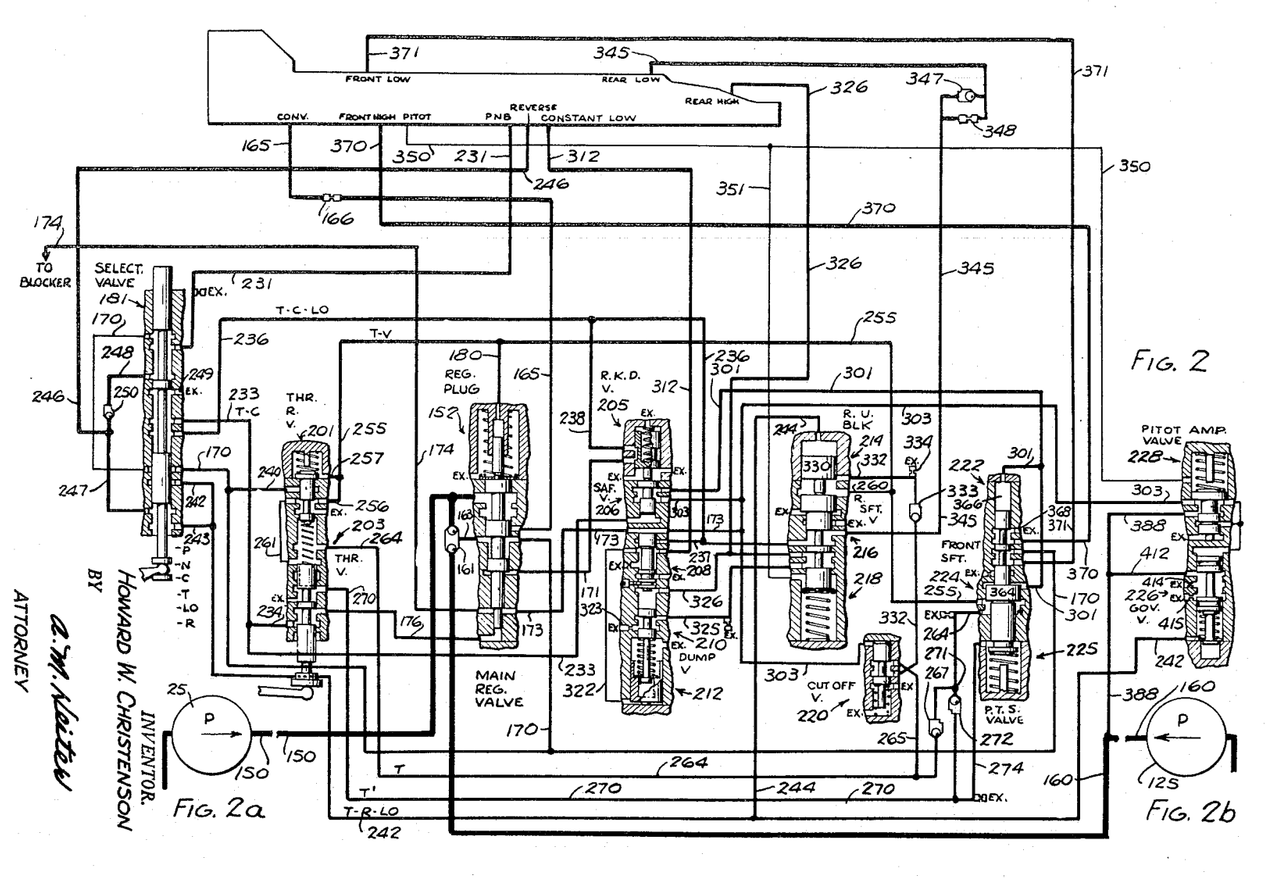
FIG. 2 is a diagrammatic view of the hydraulic control system illustrating the valves, a representation of the transmission casing and the conduit lines.
FIG. 2a is a diagrammatic representation of the front pump for the hydraulic medium.
FIG. 2b is a diagrammatic illustration of the rear pump for the hydraulic medium.

The various conduits of a hydraulic system are shown in FIG. 2 as single lines, and some lines are shown relatively heavy and some relatively light to aid in differentiating between them. Moreover, with the view of simplifying the disclosure, and economizing on reference characters wherever feasible, a port in a valve body can be considered as a part of a conduit and the reference character applied to the conduit may be considered as also applying to the port to which it connects since the port is actually a part of the conduit.

Figure 6:
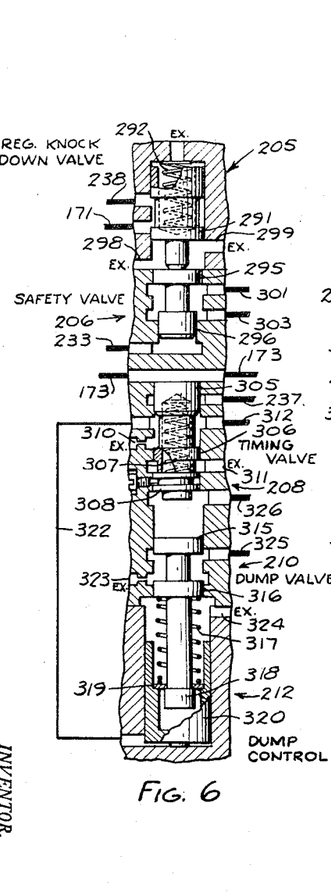
FIG. 6 is an enlarged sectional view of valves including a regulator knockdown valve, a safety valve, a timing valve, a dump valve and dump control plug.
Figures 7, 8, 9, 10:
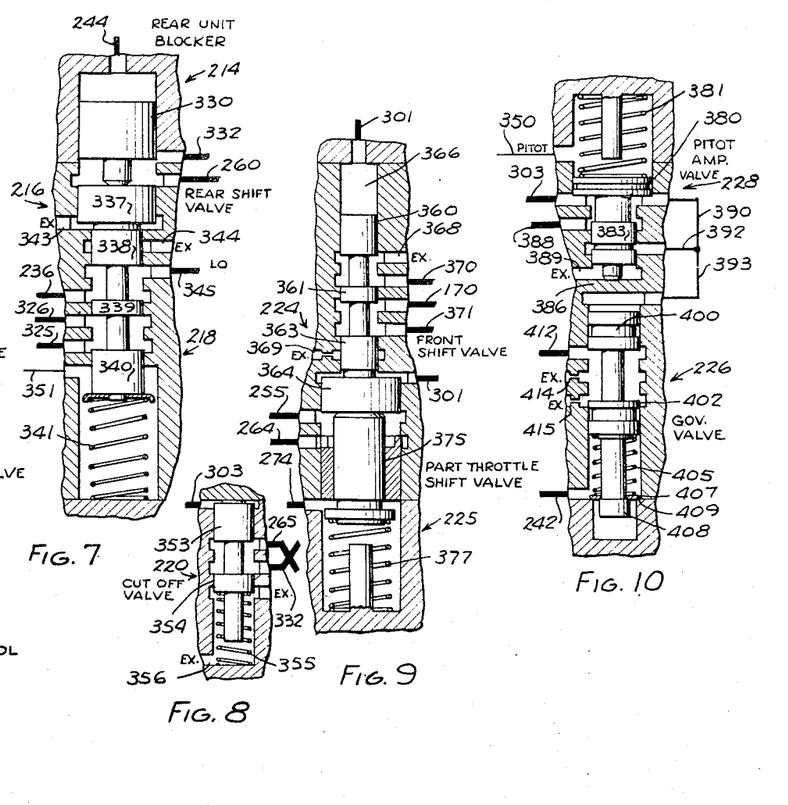
FIG. 7 is an enlarged cross-sectional view of a shift valve and a rear unit blocker.
FIG. 8 is an enlarged cross-sectional view of a cutoff valve.
FIG. 9 is a cross-sectional view of a shift valve and part throttle shift valve.
FIG. 10 is an enlarged cross sectional view of a governor valve and a Pitot tube amplifier valve.

There are a number of valve devices in the hydraulic system each generally illustrated by a reference character as follows: There is a main regulator valve 152, selector valve 181, and a throttle regulator valve 201, a throttle valve 203 (FIG. 4), a regulator knockdown valve 205, a safety valve 206, a timing valve 208, dump valve 210, a dump control plug 212 (FIG. 6), a rear unit blocker plug 214, a rear unit shift valve 216, a Pitot actuated member 218 (FIG. 7). There is a cutoff valve 220 (FIG. 8), a front shift valve 224 and a part throttle downshift plug 225 (FIG. 9). A governor valve is shown at 226 and a Pitot amplifier valve at 228 (FIG. 10).

Main regulator valve

Figure 5:
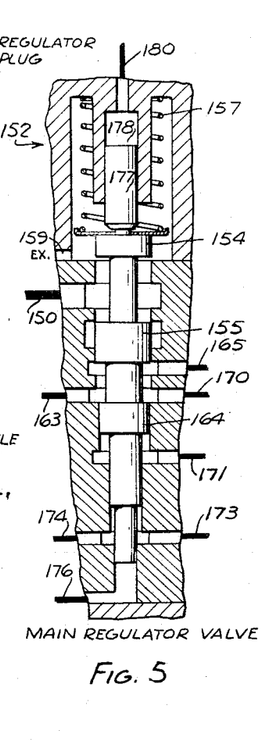
FIG. 5 is an enlarged sectional view of the main regulator valve.

A pressure line 150 extends from the front pump to the main pressure regulator valve generally illustrated at 152 (FIGS. 2 and 5). It enters between lands 154 and 155 of the movable valve member which is spring loaded by a spring 157. In FIG. 5 the valve member is shown in an operating position, elevated against the action of the spring so that some of the oil may be discharged from the exhaust port 159.

A pressure line 160 leads from the rear pump 125 and a double check valve 161 is interposed between line 150 and line 160. Pressure lines 150 and 160 connect into the regulator valve through line 163 between lands 155 and 164. Thus, both pumps may deliver oil under pressure to the main regulator valve but are not in communication with each other because of the check valve arrangement. A line 165 leads from the regulator valve to the converter. This line has a suitable restriction 166 therein. As shown in FIG. 1 the line 165 leads into the clearance between the hub portion 27 and the ground sleeve 20 thence through the thrust bearing 19 into the space to the right of the one-way coupling 42 and thence into the torus chamber. A flow of oil is maintained through the torus chamber and some escapes through the clearance between the impeller and the turbine, passes through the clearance between the turbine wall 30 and the plate 9, through apertures 37 and into the hollow 167 of the shaft 35. A relief valve in the form of a spring pressed ball 168 maintains the requisite pressure in the torus chamber. When the oil passes the ball, it is discharged into a lubrication line and then to the sump.

Another line 170 connects into the regulator valve between lands 155 and 164, and as will later be seen, this line connects into the selector valve 181 and the front shift valve 224. A line 171 connects into the main regulator valve below the land 164 and it leads to the regulator knockdown valve 205. A line 173 connects into the main regulator valve and connects into other lines which extend to the cutoff valve 220, the front unit shift valve 206, and to the Pitot amplifier valve 228. A line 174 extends from the regulator valve to a blocker element for controlling movements of the selector valve (FIG. 3).

Lines 173 and 174 can be considered as one line, but it appears convenient to use the two referred characters on the different parts thereof. Also connecting into the regulator valve 152 is a line 176 which leads to the throttle valve 203.

Associated with the pressure regulator valve is a regulator plug or piston 177 mounted in a cylinder construction 178 into which leads a line 180. Introduction of hydraulic medium through line 180 produces a force on piston 177 to influence the main regulator valve in certain operations of the mechanism.

*Selector valve*

The manually controlled selector valve 181 has a movable valve member 182 with a land 183, a land 184 and a land 186. The movable member can be shifted to any one of six positions as indicated by the notations, park, neutral, country, town, low and reverse. This may be done by a rockable shaft 187 with an arm 188 having a part disposed between abutments 189 and 190 and a notched segment 191 movable in unison therewith holds the selector valve in selected position as by means of a detent 192 shown as in the form of a spring pressed ball.

There is a blocker including a housing 194 with a spring pressed piston 195 therein, the spring 196 being disposed within the piston and reacting against a pin 197. When hydraulic medium enters the housing from line 174 and is great enough to overcome spring 197, the piston is projected against the action of the spring and it takes a position to be engaged by the portion 198 of the segment or the portion 199 of the arm. When the detent is in the neutral notched marked N, the segment and arm cannot be moved counterclockwise to the park position if the piston 195 is projected, as the portion 199 strikes the piston as shown in dotted lines. Also, if the valve is in low position the detent is in the low notch. Therefore, the valve cannot be moved to reverse position if the piston is projected because the portion 198 of the segment strikes the piston as shown by the dotted lines.

The selector valve is shown in the high range or country position in FIG. 3, whereas it is shown in the neutral position in FIG. 2.

A conduit line 231 connects into the selector valve between the lands 183 and 184, in the position shown in FIG. 3, and extends into the area between the carrier 104 and member 91 (FIG. 1). A line 233 connects into the selector valve between lands 184 and 186 and extends to safety valve 206 and it has a branch 234 which extends to the throttle valve 203. A line 236 also connects into the selector valve; it has a branch 238 which extends to the knockdown valve 205 while the line 236 continues and connects to the rear shift valve 216 with a branch thereof 237 connecting into the timing valve 208.

The heretofore described line 170 extending from the main regulator valve 152 passes through the selector valve and enters the selector valve 181 adjacent the land 183. A branch of line 170 is indicated at 240 and enters the throttle regulator valve 201.

A line 242 extends from the selector valve and enters the back side of the govenor valve 226 (FIG. 10). A branch 243 enters the selector valve below the land 186; another branch 244 enters the rear unit blocker 214. A line 246 has a branch 247 which enters the selector valve below the land 186 and a branch 248 which enters the selector valve between lands 183 and 184. The line 246 extends to the cylinder 110 (FIG. 1). The line 248 has a check valve 250 therein. The line 246 has a direct connection with the cylinder 110a (FIG. 1), while there is a check valve 251 in the line leading to the cylinder 110. The line 246 also connects into the cylinder 110 through a relatively small bleed port 252.

*Throttle regulator valve and throttle valve*

A line 255 connects into the throttle regulator valve 201 as at 256 and 257. This line connects into line 180 which leads to the regulator plug 152; it connects into the rear unit shift valve through line 260 and connects into the front shift valve 224 (FIGS. 2 and 9). There is a line 261 which forms an interconnection between the throttle regulator valve 201 and the throttle valve 203 (FIG. 4). A line 264 connects into the throttle valve 203; a branch 265 thereof connects into the cutoff valve 220, a check valve 267 is disposed in line 264 and the line continues and connects into the front shift valve 224 (FIG. 9).

A line 270 connects into the throttle valve 203 and connects into the line 264 at 271 with an interposed check valve 272. Line 270 has branch 274 which also connects into the part throttle shift valve 225.

The throttle valve 203 has a movable member with a land 280, a land 281, and a land 282 is arranged to be acted upon by an actuating element 284 which is part of the manually operated engine throttle linkage. It also has a land 285 arranged to move into a recess 283 in the body of the valve to provide a detent action to the movement of the throttle.

A spring 287 is interposed between the throttle valve 203 and movable member of the throttle regulator valve 201. The throttle regulator valve has a land 288 and a land 289. The throttle regulator valve has an exhaust port 290. The lines 264 and 274 which are connected to line 270 have restricted exhausts as shown in FIG. 2.

*Regulator knockdown valve*

The regulator knockdown valve 205 has a movable member with a land 291 acted upon by a spring 292; lines 238 and 171 connect into it as shown.

The movable element of the regulator knockdown valve acts upon a safety valve, the movable element of which has a land 295 and a land 296. Associated with the knockdown valve 205 and safety valve 206 is an exhaust port 298 and an exhaust port 299. The knockdown regulator valve member acts upon the safety valve member. A line 301 connects into the safety valve and into the upper end of the front unit shift valve (FIG. 9). A line 303 extends from the safety valve and connects into the Pitot amplifier valve (FIG. 10). A branch of the line 303 also enters the cutoff valve; connecting into the line 303 is the line 173; this line, as aforesaid, enters the main regulator valve. Line 173 passes through the timing valve 208 and acts on the land 305 thereof (FIG. 6). The movable element of the timing valve has a land 306 and it is acted upon by a spring 307 which reacts against a fixed element 308. The timing valve has a restricted exhaust 310 and an exhaust port 311. The head 305 controls the connection with a line 312 which extends to a cylinder portion 92a of the cone brake 89–90 (FIG. 1).

*Dump valve*

The dump valve (FIG. 6) has a movable element with a land 315, a land 316, and it is acted upon by a coil spring 317. The dump valve member has a stem with a head 318 which underlies a washer 319; the washer seats on an internal shoulder of a piston 320 which constitutes a dump control. A line 322 interconnects the timing valve and the dump control chamber. The dump valve has an ensmalled exhaust 323 and an exhaust 324. A line 325 having a restricted exhaust (FIG. 2) connects into the dump valve and extends to the rear shift valve 216 (FIG. 7).

Connecting into the dump valve above the head 315 is a line 326 which connects into the rear shift valve 216 (FIG. 7). This line 326 (FIGS. 1 and 2) extends to the cylinder 97 passing through a bore in the shaft 84 which bore is blocked as at 327.

*Rear unit blocker and rear shift valve*

A rear blocker unit (FIG. 7) has a movable element 330 movable in a chamber having a closed end into which line 244 connects. Lines 332 and 260 are connected into the chamber between valve element 330 and land 337 of the rear unit shift valve. Line 332 is connected to the cutoff valve (FIG. 8). In line 332 is a check valve 333 as well as a restricted exhaust 334. The rear shift valve has a body, and a movable element thereof has a land 337, a land 338, a land 339, and a land 340, and it is acted upon by a spring 341. There is an exhaust 343 and an exhaust 344. Connecting into the rear shift valve is a line 345 which extends to the cylinder 92 (FIG. 1). In the line 345 is a check valve 347 and a restricted passage 348 (FIG. 2). Leading from the Pitot tube is a line 350 (FIG. 1) and it has a branch 351 which connects into the rear shift valve so that the pressure thereof acts on the underside of the valve member as FIG. 7 is viewed. The Pitot pressure line 350 continues and enters the Pitot amplifying valve as indicated at FIG. 10.

Cutoff valve

The cutoff valve 220 (FIG. 8) has a movable element with a land 353, a land 354, and it is acted upon by a spring 355 and the body has an exhaust port 356. The lines connecting into the cutoff valve have already been described and are indicated in FIG. 8.

The front shift valve

This valve structure is shown in FIG. 9 and the movable element has a land 360, a land 361, a land 363, and a land 364. The line 301 connects into a chamber 366 to act upon the land 360. There is an exhaust 368 and a restricted exhaust 369. The line 170 enters between the lands 361 and 363 in the position of the valve shown in FIG. 9. A line 370 connects into the shift valve and to the cylinder 74 (FIG. 1). Also a line 371 connects into the shift valve and extends to the cylinder 66 (FIG. 1).

Part throttle shift valve

The part throttle shift valve has a movable valve member 375 which acts upon the front shift valve member; the valve member 375 is spring pressed by the coil spring 377 and the heretofore described conduit lines 255, 264 and 274 enter the chamber of the part throttle shift valve as indicated in FIG. 9.

Pitot amplifying valve

This valve, as shown in FIG. 10, has a movable member with a land 380 positioned in the chamber into which the pressure line 350 from the Pitot tube connects and it is spring pressed by a coil spring 381. This valve also has a land 383 and is arranged to bottom on a fixed portion of the valve body as at 386. Connecting into the valve is the line 303 which extends to and connects into the safety valve and cutoff valve. Also connecting into the valve is a pressure line 388 which connects into the rear pump line 160 of the rear pump 125 (FIG. 2). The Pitot amplifier valve has an exhaust 389. The line 303 actually extends through the Pitot amplifier valve as indicated at 390. The line 390 has a branch 392 which also connects into the Pitot amplifier valve and a branch of 393 which connects into the governor valve 226 (FIG. 10).

The governor valve

The governor valve has a movable valve member with a land 400, and a land 402. The valve member is acted upon by a coil spring 405, which acts on the head 402 and reacts on a washer 407, slidably mounted on the valve member and held thereon by a head 408. At times the washer 407 seats on the shoulder 409.

Connecting into the governor valve is a line 412 (FIG. 10) which is actually a branch of the line 388 conveying oil under pressure from the rear pump 125. The governor valve has what might be termed a primary exhaust port 414 and the secondary exhaust port 415.

It will be understood, of course, that the various valves and many of the interconnecting conduit lines may be compactly formed in a general valve body. However, for purposes of clarity, many of the valves have been separated and individually shown in the drawings.

In considering the operation of the transmission and its control, the different conditions established by the selective positioning of the selector valve will be considered.

With the engine running, pressure from the front pump 25 passes into the main regulator valve through line 150 and 163, and the pressure may be regulated by shift of the valve member to a position as indicated in FIG. 5, with discharge through port 159. Main line pressure passes through the main regulator valve 152 into line 170.

Park position

In the park position the selector valve member is in the uppermost position, and line 170 communicates into line 231 (park-neutral-brake) in the area between carrier 104 and member 91. The thrust on the carrier 104 is communicated therethrough to the sun gear 85 and insures release of the cone 89 from the brake member 90. The line 246–248 to the reverse brake is vented through the exhaust 249. The line 236 (town-country-low) and the line 233 (town-country) are both vented through the port 249. The line 242 (town-reverse-low) is exhausted through the line 243 out the end of the selector valve below the land 186.

As foresaid, the selector valve cannot be moved into the park position at vehicle speeds which provides a governor pressure in line 174 to hold the piston 195 in blocking position (FIG. 3). This governor pressure comes from the governor valve through line 303, into line 173, to the main regulator valve, thence into line 174 to the blocker cylinder 194. When the vehicle drops below a minimum speed, the governor pressure drops so that the blocker piston 195 is retracted by the spring 196 thus permitting the selector valve to be shifted to the park position. As aforesaid, when parked, the park pawl 121 may be engaged with the teeth 120 of the member 97. The terminology applied to some lines, such as town, country, low, are abbreviated on the drawings where the first letters of these terms are indicated.

The venting of the lines 236, 233 and 242 exhausts the clutch and brake cylinders of the rear unit of the transmission so that no drive is transmitted. The park neutral brake line 231 and the front unit low line 371 when not supplied with fluid will exhaust sufficiently by leakage so that no brake or clutch is engaged. This is the condition which maintains when the engine is at rest and there is no pressure of the hydraulic medium. If the engine is running, the fluid pressure in the system will be connected through the selector valve 181 to line 231 to engage the park-neutral-brake and through front shift valve 222 to line 371 to engage low in the front unit.

Neutral position

In the neutral positon the selector valve member is moved to neutral position, the main line pressure remains connected through line 170 to the line 231 (park-neutral-brake) and lines 233, 236 and 243 remain exhausted. Thus the transmission remains conditioned with no oil under pressure transmitted to the clutch and brake operating cylinders of the rear unit. When the engine is started or the vehicle is coasting, the pumps 25 and 125 will provide fluid under pressure to line 170 to the front shift valve 224 to engage the front low ratio and to line 231 to engage the park-neutral-brake.

High-range or country position

When the selector valve is in this position it is as shown in FIG. 3. Main line pressure from line 170 is admitted into lines 233 (town-country) and lines 236 (town-country-low). Line 231 (park-neutral-brake) and the line 246–248 (reverse) are exhausted through port 249. Also the line 242–243 (town-reverse-low) is exhausted through the lower end of the selector valve.

Low range or town position

In this position, the main line pressure is cut off from line 233 (town-country) but is opened to line 236 (town-country-low) and main line pressure is also admitted from line 170 to line 242 (town-reverse-low). The line 243 which serves to exhaust line 242 is closed.

Considering now the forward operation of the transmission, both in low range (town) and in high range (country). Line pressure extends through the main regulator valve, line 170, to the front shift valve 224. This pressure is admitted through the front shift valve 224 (FIG. 9) to line 371 and into the cylinder 66 (FIG. 1) to engage the low speed brake of the front unit 62–63. Main line pressure in line 170 is admitted into line 236 (town-country-low) through the selector valve and line 236 connects into the rear shift valve 216 and admits oil into line 345 which conducts oil into the cylinder 92. This engages the low ratio brake 89–90 of the rear planetary unit. Therefore, the front planetary unit transmits torque at its reduced ratio and the rear planetary unit transmits torque at its reduced ratio, and the transmission is conditioned for its lowest ratio, for example, about 2.10:1. The first upshift is in front planetary unit. As the speed of the car increases, the main regulator valve shifts, as shown in FIG. 5, so that oil from the front pump is exhausted through port 159 and oil from the rear pump enters the line 170. Pressure from the rear pump passes to the governor valve through line 388 to line 303 thence through the safety valve 206 into line 301, which enters the front shift valve above the head 364. Thus the front shift valve is subjected to pressure which varies with the speed of the vehicle. Also, the front shift valve is under the influence of pressures in lines 255, 264 and 270 which connect into the throttle regulator valve 201 and throttle valve 203. Pressure in line 270 is admitted under the head 375 of the front shift valve. Pressure is also admitted under the head 364 from line 255 which is supplied by the throttle regulator valve 201. With the front shift valve downshifted, line 255 is connected via line 264, check valves 272 and 274 to the space below head 375. Line 264 is connected through check valve 267 to the space below head 364. Thus the front shift valve is under the influence of pressure incident to speed, and pressure incident to position of the throttle which can be translated into terms of torque, and when speed and torque conditions dictate, the front shift valve member is shifted downwardly to position the head 361 so as to shut off the pressure line 170 from the line 371 and to open the line 170 to line 370 and thus the low ratio cone brake 62–63 is released and the direct drive clutch 70 engaged.

When conditions dictate, as by lowering of the speed, the front shift valve may shift back to the position shown in FIG. 9, for low ratio drive in the front unit. It is at this time that the self-energizing feature of the cone brake becomes effective. The torque felt on the gearing, as aforesaid, urges the cone 62 towards engagement and it engages under this load as the clutch 70 disengages. This engagement may actually occur at times before pressure is transmitted into the cylinder 66. Thus, there is a smooth and self-timing interrelation between the clutch 70 and the cone brake 62–63. As the clutch 70 is disengaging and therefore lessening the load on the cone member 62, the thrust incident to torque is engaging the brake so that there is no lag or break or time period between the disengagement of the disc clutch and the engagement of the cone brake.

The self-timing interrelationship of the cone brake 62–63 and the clutch 70 is also effective during the engagement of the clutch and the release of the brake. As the piston 73 applies packing pressure to the clutch, reaction is taken by the brake member 62 inasmuch as the torque load on the helical teeth loads the brake member to the right, as FIG. 1 is viewed, even when the cylinder 66 is exhausted of oil. As the clutch gradually engages, the engaging load on the cone member 62 gradually lessens, and finally as the clutch 70 nears full engagement, the brake member 62 is urged to the left and the brake member disengaged. So in this function, there is a self-timing operation with no time period involved when both the clutch and the brake are disengaged. The brake and clutch arrangement involving the brake 89–90 and the clutch 95 for the rear unit operates in substantially the same manner, with the self-timing function occurring as the clutch 95 is being engaged and the brake disengaged, and when the brake is engaging and the clutch disengaging. The rear unit cone is not fully self-energizing from the sun gear helix.

Thus, when the operator places the selector valve in low range or "town" position, the transmission normally functions with the rear planetary set operating in reduction and two speed ratios available in the front planetary unit.

In the high range or country position, which is the position of the selector valve shown in FIG. 3, main line pressure from line 170 is admitted into lines 233 and 236. Line 236 extends to the rear shift valve. Line 242 through line 243 is vented. Since this line connects into line 244, there is no pressure on the top of the head 330. The rear shift valve moves upwardly thus connecting line 236 to line 326, thus engaging the disc clutch 95 and conditioning the rear unit in 1:1 ratio. At the same time line 345 is exhausted at the rear shift valve. Pressure from line 170 passes through the front shift valve 224 into line 371, and thence into the cylinder 66 to engage the cone brake of the front unit and condition it for transmission of torque at reduced ratio. At this time line 370 leading to the cylinder for the disc clutch 70 is exhausted through port 368. Under proper conditions of speed and torque the front shift valve member raises, as FIG. 9 is viewed, thus connecting line 170 with the line 370, thus introducing oil into the cylinder for engaging the clutch 70 thus conditioning the front unit for 1:1 drive. The normal operation in country range is therefore with shift of the front unit from low ratio to direct with the rear planetary unit in 1:1 ratio.

Down shift in country range

This shift involves releasing the front unit clutch 70 and engaging the cone brake 62–63. It may occur at vehicle speeds in a range of 55 m.p.h. or lower. An operator may effect this shift in order to reduce the ratio for acceleration of the vehicle, as for example, for the passing of another vehicle.

The operator depresses the accelerator. When this is done the head 285 enters the recess 283 and it meets resistance due to the oil escaping through the recess 281. This serves as a detent action to impart intelligence to the operator. When this is done the TV pressure in line 255 connects through line 261 and into the T pressure line 264. This line (FIG. 1) passes through the check valve 267 into the front shift valve under the head 364 and elevates it. The land 361 moves upwardly connecting pressure line 170 to line 371 (this being the position shown in FIG. 9) and vents line 370 through exhaust 368. Thus oil is conducted through line 371 to the cylinder 66 and the pressure line to the cylinder 74 is exhausted. Since torque is being transmitted, the thrust incident thereto urges the cone 62 into engagement with the brake member 63 as the clutch 70 is disengaging. Thus the brake will engage even before actuation of the piston 65 so that there is no time lag, as aforesaid, between the disengagement of the clutch 70 and the engagement of the brake 62–63. Accordingly, the engine cannot accelerate and "run away," so to speak. Pressure in the line 264 is necessary to do this because the governor pressure at this time is high. The high governor pressure in line 303 at this time shifts the cutoff valve 220 downwardly and thus the T pressure in lines 264 and 265 is cut off by the cutoff valve.

Part throttle downshift

This same downshift may be made at relatively lower speeds of the vehicle, say for example, under 35 miles per hour by shift of the throttle short of the detent action.

This movement of the throttle valve connects TV pressure in line 255 via line 261 to provide T' pressure in line 270. This pressure passes through line 274 into the part throttle shift valve 225 so that it acts under the plug 375. This results in a similar shift of the front shift valve moving it upwardly, connecting the pressure line 371 to the brake 62-63 cutting off pressure line 370 to the disc clutch 70. At this time the throttle valve does not connect TV pressure in line 255 to the T pressure line 264. The governor pressure is lower at this time due to the lower vehicle speed.

Double downshift

At relatively lower vehicle speeds, say for example, up to 35 miles per hour, when operating in the high range at 1:1 ratio, a downshift may be made in both front and rear planetary units. To do this the throttle is depressed beyond the detent; the head 285 is urged into the recess 281. This, in the manner explained above, connects TV pressure in line 255 to T pressure in line 264, and effects a shift by connecting pressure line 170 into the pressure line 371 for the front unit brake and exhausts pressure line 370 for the front unit clutch. Pressure is also admitted into the line 264 which passes through the cutoff valve through line 265 thence through check valve 333 and line 332 into the rear shift valve. The rear shift valve member which is positioned upwardly at this moment is shifted down to the position shown in FIG. 7, and the pressure in line 236 passes into line 345 to engage the cone brake of the rear planetary unit. At the same time, line 326 leading to the rear unit friction clutch is exhausted through line 325 and between ports 315 and 316 of the dump control valve 212, the exhaust being at 323. The shift in the two units occur substantially simultaneously.

The dump control plug 212 controls the exhaust from the rear unit high clutch cylinder 97. It is under the control of pressure entering through line 326 acting upon head 315 and pressure from line 312 passing through line 322 to the underside of the piston 320. This pressure in line 322 is open only at low speeds due to the function of the timing valve.

If full throttle is maintained, the front planetary unit will upshift first to direct drive followed by an upshift of the rear planetary unit to direct drive. However, if the throttle is relieved at a fairly low speed, the rear planetary unit will upshift first.

Timing valve

Governor pressure entering the timing valve 208 through line 173 at speeds above about ten miles per hour is sufficient to hold the timing valve member 305 down. This cuts off the pressure in line 312 from the underside of the dump control piston 320. It also cuts off the constant pressure line 312 which enters the cylinder portion 92a (FIG. 1). When the timing valve is upwardly positioned by reason of speeds under about ten miles per hour, or during an idling condition while the selector valve is in country, town or low position, there is a constant pressure introduced through line 237 into line 312 to act on the cone 89. The reason for this is that if an operator quickly depresses the throttle, the rear plantary unit is conditioned to transmit torque at its reduced ratio. The relief of pressure under the piston 320 permits a high rate of exhaust of the rear clutch cylinder 97.

Cutoff valve

The cutoff valve function has been heretofore considered in connection with the description in conjunction with some of the ratio shifts. Above about 35 miles per hour, the governor pressure entering line 303 is high enough to shift this valve downwardly and close off the connection between lines 265 and 332. This cuts off T pressure from passing to the rear shift valve.

Low range

When the selector valve is shifted to the low position, the transmission is conditioned to transmit torque through both the front and rear planetary units at low ratio. However, there is a function of the safety valve which permits of an upshift in case of excessive engine speeds.

When in the low position, main line pressure is opened to line 242 (T-R-Lo), and to line 236 (T-C-Lo). Pressure in line 233 (T-C) is cut off from the safety valve. The safety valve 206 (FIG. 6) shifts downwardly and cuts off governor pressure line 303 from line 301 leading to the front shift valve 224. Line 236 (T-C-Lo) is cut off by the regulator knockdown valve 205 from the main regulator valve 152 because the safety valve no longer holds the regulator knockdown valve in upward position (FIG. 6). This results in higher line pressure. The pressure in line 242 (T-R-Lo) is transmitted to line 244 into the rear unit blocker plug 214 thus holding the rear shift valve in its low position. The transmission is thus locked, so to speak, in its lowest range. However, if under these conditions, there is an excessive engine speed, resulting in excessive high pressure in the governor line 303, the governor pressure entering the safety valve and functioning on the differentially sized heads 295 and 296 will shift the safety valve upwardly and open the line 301 to line 303 thus transmitting pressure to the cylinder 366 at the upper end of the front shift valve 224 which will cause the valve to function and shift the front unit from its low ratio to its high ratio.

Reverse

When the selector valve is in reverse position, main line pressure from line 170 is admitted into line 247 (T-R-Lo) which communicates into line 246 which in turn leads to the cylinder 110 which functions to engage the brake 106-107. Also, the line 242 (T-R-Lo) is open to main line pressure. Since the vehicle will be going backwards, there is no rear pump pressure. The only source of pressure is the front pump. Pressure in the main line 170 passes through the front shift valve 224 and into line 371 and into cylinder 66 to engage the cone brake of the front planetary unit. Thus, the front planetary unit is in reduction as it transmits torque to the second planetary unit which is conditioned for reverse.

At this point it seems fitting to again point out that when the selector valve is in town, or low position, the hydraulic medium is conducted into the governor valve through line 242 thus raising it to close off the lower exhaust port 415. This causes an increase in governor pressure in town, and low range. Since shift is desired in the town range at lower vehicle speeds, the increase in the governor pressure incident to the closing off of one exhaust port, results in sufficient pressure for effecting such shifts.

Operation in reverse

Attention is directed to the conduit lines leading to the cylinder 110-110a, the piston in which functions to engage the reverse brake 106-107. For effecting a gradual engagement oil under pressure is delivered rapidly through line 246 into the small diameter portion of the cylinder 110a for a fast initial engagement. Oil under pressure bleeds more slowly into cylinder 110 to insure a slow build-up and positive engagement ultimately. Thus, in operating in reverse, the brake 106-107 is softly and gradually engaged to provide smooth operation. This is particularly desirable in view of the relatively high reduction in reverse. However, when the line is exhausted, the cylinder 110 exhausts rapidly through the check valve 251 as does, of course, the cylinder 110a.

*Governor valve*

The pressure produced by the rear pump is proportional to vehicle speed as determined by the main regulator valve. The pressure from the rear pump passes to the Pitot amplifier valve through line 388 and to the governor valve through line 412 where it is exhausted through ports 414 and 415. The pressure from line 388 passes into the line 303. At low vehicle speeds, the pressure acting upon the underside of head 380 is not sufficiently high to elevate this head against the action of the spring 381 plus the pressure from the Pitot tube entering through line 350. The governor pressure passing through line 393 acts on the land 400 but at low speeds is insufficient to depress the governor valve. The normal forward limit of the governor valve member is determined by the spring pressed washer 407. As vehicle speed increases, rear pump pressure increases, the governor valve is depressed and the head 400 cuts off pressure line 412 from the exhaust ports. At the same time Pitot pressure has been increasing thus increasing the load on the top of the head 380. Increase of speed results in increase of Pitot pressure shifting the amplifier valve member downwardly thus connecting the rear pump pressure line 388 into the governor line 303; governor pressure is then effective on the underside of head 380 tending to shift the amplifier valve upwardly and tending to close the connection between the rear pump pressure line 388 and the governor line 303. Thus it will be seen that the Pitot pressure causes the Pitot amplifier valve to regulate the governor pressure in line 303. Moreover, when the selector valve is in town, and low positions, pressure is introduced into the governor valve through line 242 which acts on the underside of the valve member and elevates it to close exhaust port 415 by the head 402. This functions to increase the governor pressure in town and low range below the point where Pitot takes over.

I claim:

1. In a mechanism for the transmission of torque, a driving member, a driven member, planetary gearing interrelated with the driving and driven members and including a ring gear member, a sun gear member, a carrier member with planetary gears thereon, a shiftable brake member connected to one of the planetary gear members, a stationary brake member therefor, the gear members having helical teeth so arranged that when loaded by the transmission of torque the friction brake member is shifted thereby into engagement with the stationary brake member, a plate clutch for interconnecting two members of the planetary gearing, means for applying packing pressure on one side of the clutch to engage it, the shiftable brake member being positioned to take the reaction of the packing pressure to initially limit the reaction and packing pressures to limit clutch torque capacity proportional to load and being shiftable out of engagement with the stationary brake member by said packing pressure, means for releasing the packing pressure for the clutch, whereby the torque load on the helical gear teeth shifts the friction brake member into engagement with the stationary brake member during the releasing of the clutch, and additional means for applying pressure to the shiftable brake member urging it into engagement with the stationary brake member.

2. In a mechanism for transmitting torque, the combination of gearing having helical teeth, a shiftable friction brake member connected to a gear member, a stationary brake member therefor, the helical gear teeth, when subjected to torque load, placing a thrust on the shiftable brake member to shift it into engagement with the stationary brake member, to thereby condition the gearing for the transmission of torque at one ratio, a friction clutch interconnected with the gearing, means for applying packing pressure to engage the clutch, the shiftable brake member being positioned to take the reaction of the packing pressure and being shiftable thereby in a direction to disengage the stationary brake member, whereby the shiftable brake member is engaged with and disengaged from the stationary brake member as the packing pressure for the clutch is respectively released and applied, wherein the means for applying packing pressure to the clutch is a hydraulically actuated motor, and another hydraulically actuated motor for applying additional pressure to the shiftable brake member for engaging it with the stationary brake member.

3. In a mechanism for the transmission of torque, a housing, a driving member, a driven member, planetary gearing interrelated with the driving and driven members and including a ring gear member, a sun gear member, a carrier member with planetary gears thereon, a shiftable brake member connected to one of the planetary gear members and movable between an applied and a released position, means to limit movement of said shiftable brake member at said released position and transfer reaction forces to said housing, a stationary reaction brake member therefor, the gear members having helical teeth so arranged that when loaded by the transmission of torque the shiftable brake member is shifted thereby to the applied position into engagement with the stationary brake member, a clutch for interconnecting two members of the planetary gearing, means for applying packing pressure on one side of the clutch to engage it, the shiftable brake member being positioned to take the reaction of the packing pressure to limit the reaction and packing pressures to limit clutch torque capacity proportional to load during movement from said applied position to said released position and in said released position being out of engagement with the stationary brake member, said clutch being engaged by said full packing pressure to provide full clutch engagement, means for releasing the packing pressure for the clutch, whereby the torque load on the helical gear teeth shifts the friction brake member from said released to said applied position in engagement with the stationary brake member during the releasing of the clutch.

4. In a mechanism for transmitting torque, a housing, the combination of gearing having helical teeth, a shiftable friction brake member movable between an applied and a released position and connected to a gear member to provide one ratio drive means to limit movement of said shiftable friction brake member beyond said released position and transfer the reaction forces to said housing to hold said shiftable brake member at said released position, a stationary brake member therefor, the helical gear teeth, when subjected to torque load, placing a thrust on the shiftable brake member to shift it from said released to said applied position in engagement with the stationary brake member proportional to load during movement, to thereby condition the gearing for the transmission of torque at one ratio, a friction plate clutch having a surface area interconnected with the gearing to provide another ratio drive, means for applying a packing pressure during movement to engage the full surface area of said clutch, the shiftable brake member being positioned to take the reaction of the packing pressure as limited by said thrust proportional to load during movement and being shiftable thereby from said applied to said released position in a direction to disengage the stationary brake member and during this movement to maintain a clutch torque capacity proportional to load and at said released position engaging said means to limit movement to apply said clutch with the full packing pressure and the shiftable brake member is engaged with the stationary brake member as the packing pressure for the clutch is released.

5. In a variable speed power transmission mechanism; the combination comprising a housing, a planetary gear unit having a plurality of elements providing a plurality of ratios and including a load responsive means movable in response to load on the planetary gear unit, a movable and a stationary brake member, one element of said planetary gear unit being drivingly connected to said movable brake member to rotate said movable brake member, said load responsive means being connected to said movable brake member to thrust said movable brake member with a force proportional to load in one direction from a released to an applied position in engagement with said stationary brake member to provide one ratio, means to limit movement of said movable brake member from said applied position at said released position by transferring the reaction force to said housing, a plate clutch connecting two elements of said gear unit to provide another ratio having packing pressure means engaging the full clutch area in all positions of said movable brake member, and said movable brake member being disposed to take the reaction of packing pressure to engage the clutch and to be movable thereby in the opposite direction from said engaged to said disengaged position to disengage the movable brake member from the stationary brake member and to limit the packing pressure and torque capacity in proportion to load during clutch engagement and at said disengaged position engaging said means to limit movement to apply said clutch with the full packing pressure.

6. In a transmission mechanism according to claim 5, a motor operatively engaging said movable brake member to urge said movable brake member in a releasing direction to prevent engagement of said brake member due to movement by said load responsive member, and control means to actuate said motor in control ranges in which the brake member is not engaged.

7. In a transmission mechanism according to claim 5, and clutch control means to apply a high apply force to engage said clutch to provide one ratio, primary brake control means to apply a high apply force to engage said brake members to provide another ratio, and secondary brake control means to apply a low apply force to engage said brake below a predetermined speed of said output member to provide a smooth shift from one to another ratio.

8. In a transmission; a housing; drive means having first friction torque establishing drive means for establishing a first drive and second friction torque establishing drive means for establishing a second drive; said first friction means including a reaction member grounded to said housing, a first movable member movable between an applied and a released position, first reaction friction surface means on said reaction member and first movable friction surface means on said first movable member engageable to engage said members, said first movable member being movable in an apply direction toward said grounded member to an engaged position to engage said first reaction friction surface means on said first movable friction surface means between said first movable member and said reaction member to engage said first friction drive means and said first movable member being movable in an opposite release direction to a released position to release said first friction drive means; reaction transfer means to limit release movement of said first movable member at said released position and to transfer the reaction force from said first movable member to said housing at said released position; said second friction drive means including a second movable member and a second friction surface means on each of said first and second movable members; said second movable member being movable in an apply direction to engage said second friction surface means between said first and second movable members to engage said second friction drive means and to move said first movable member to said released position determined by said reaction transfer means to release first friction drive means; and first and second actuator means operatively connected respectively to said first movable member of said first friction drive means and to said second movable member of said second friction drive means, said first actuator providing a force proportional to load and each actuator operative on movement from released to engaged positions to initially engage said first and second friction drive means with a force proportional to load and to selectively finally engage said first and second friction drive means respectively with a force determined by said first and second actuator means.

References Cited by the Examiner

UNITED STATES PATENTS

| | | | |
|---|---|---|---|
| 1,839,145 | 12/1931 | Forichon | 192—18 |
| 2,003,795 | 6/1935 | Wilsing. | |
| 2,069,408 | 2/1937 | Forichon | 74—767 |
| 2,175,382 | 10/1939 | Eason | 192—18 |
| 2,180,218 | 11/1939 | Wissman. | |
| 2,348,763 | 5/1944 | Syrovy et al. | 74—781 |
| 2,419,253 | 4/1947 | Cahill | 74—785 |
| 2,485,623 | 10/1949 | McNairy. | |
| 2,654,269 | 10/1953 | Wilson | 74—781 |

DAVID J. WILLIAMOWSKY, *Primary Examiner.*

THOMAS C. PERRY, *Examiner.*